US008005659B2

(12) United States Patent
Nelson et al.

(10) Patent No.: US 8,005,659 B2
(45) Date of Patent: Aug. 23, 2011

(54) SIMULATION OF COUPLED OBJECTS

(75) Inventors: Donald Nelson, Montgomery Village, MD (US); Milan Ikits, Gaithersburg, MD (US)

(73) Assignee: Immersion Medical, Inc., Baltimore, MD (US)

( * ) Notice: Subject to any disclaimer, the term of this patent is extended or adjusted under 35 U.S.C. 154(b) by 252 days.

(21) Appl. No.: 11/774,223

(22) Filed: Jul. 6, 2007

(65) Prior Publication Data

US 2009/0012755 A1 Jan. 8, 2009

(51) Int. Cl.
*G06G 7/58* (2006.01)
(52) U.S. Cl. .............................................. 703/11; 703/6
(58) Field of Classification Search .................. 703/6, 11
See application file for complete search history.

(56) References Cited

U.S. PATENT DOCUMENTS

| 7,056,123 | B2 * | 6/2006 | Gregorio et al. | 434/272 |
| 7,520,749 | B2 * | 4/2009 | Ohlsson | 434/262 |
| 2008/0020362 | A1 * | 1/2008 | Cotin et al. | 434/267 |
| 2008/0088578 | A1 * | 4/2008 | Ikits et al. | 345/156 |

FOREIGN PATENT DOCUMENTS

WO WO 2004051602 A1 * 6/2004

OTHER PUBLICATIONS

Cotin et al., New Approaches to Catheter Navigation for Interventional Radiology Simulation, 2005, Springer Berlin / Heidelberg, vol. 3750/2005, 534-542.*
Cotin et al, A hybrid elastic model for real-time cutting, deformations, and force feedback for surgery training and simulation, 2000, Springer-Verlag, 437-452.*
Paolo Baerlocher, "Inverse kinematics techniques for the interactive posture control of articulated figures," 2001, Ecole Polytechnique Federale De Lausanne, XP002506493.
Lenoir et al., "Interactive physically-based simulation of catheter and guidewire," Computers and Graphics, Elsevier, GB, vol. 30., No. 3, Jun. 1, 2006, pp. 416-422, XP005486670.
Brown J. et al., "Real-Time Simulation of Deformable Objects: Tools and Application," Computer Animation, 2001. The Fourteenth Conference on Computer Animation Proceedings Nov. 7-8, 2001, Piscataway, NJ. USA, IEEE, Nov. 7, 2001, pp. 228-236, XP010576645.

(Continued)

*Primary Examiner* — Paul L Rodriguez
*Assistant Examiner* — Aniss Chad
(74) *Attorney, Agent, or Firm* — Kilpatrick Townsend & Stockton LLP

(57) ABSTRACT

A simulator for simulating a first object and a second object that is coupled to the first object is disclosed. The simulator models the first and second objects as a plurality of segments, with each segment having a plurality of nodes connected by one or more edges. The simulator then indexes each of the nodes and couples at least one node of the first object to a node of the second object. The indexing and coupling is based on the current simulated position of the first and second objects. The simulator then generates and solves a linear system of equations $Ay=b$ from the indexing, and updates a position of each of the nodes. The simulator flow then dynamically re-indexes the nodes, and continues in a loop.

21 Claims, 10 Drawing Sheets

OTHER PUBLICATIONS

International Search Report and Written Opinion—PCT/US2008/063488.

Baraff & Witkin, Large Steps in Cloth Simulation, Computer Graphics Proceedings, Annual Conference Series, 1998, SIGGRAPH 98, Orlando, Jul. 19-24, pp. 43-54.

Boxerman & Ascher, Decomposing Cloth, Eurographics/ACM SIGGRAPH Symposium on Computer Animation (2004).

Cotin, Delingette & Ayache, Real-time elastic deformations of soft tissues for surgery simulation, TVCG 1998.

Lindblad, Turkiyyah, Weghorst & Berg, Real-time Finite Element Based Virtual Tissue Cutting, MMVR 2006.

Gregoire, M. et al., Interactive Simulation of One-Dimensional Flexible Parts, Association for Computing Machinery Inc., Cardiff, Wales, United Kingdom, pp. 95-103, Jun. 2006.

* cited by examiner

SIMULATION OF COUPLED OBJECTS

FIELD OF THE INVENTION

One embodiment is directed to the simulation of objects. More particularly, one embodiment is directed to the simulation of coupled objects.

BACKGROUND INFORMATION

The growth of minimally invasive therapies has led to a growing interest in the potential for computer-based simulation for training. Many computer-based medical simulators have been designed to teach these new techniques. Most of these efforts have focused on laparoscopic surgery, in which rigid tools are inserted into the patient's abdomen and visual feedback is provided by an endoscopic camera that produces a high-definition color image. These simulators are predominantly skills trainers, emphasizing the two-dimensional hand-eye coordination practice that is useful for laparoscopic surgery.

Interventional cardiology shares characteristics with other minimally invasive therapies that make it suitable for simulator-based learning: it requires complex understanding of three-dimensional anatomy from two-dimensional displays and fine hand-eye coordination. As with surgery, complications from improperly performed cardiac catheterization can have catastrophic results. Thus, there is a strong need for simulator based training before an actual procedure is attempted.

However, interventional cardiology simulation presents unique challenges. First, visual feedback is not provided by visible light but by fluoroscopy, which must be simulated in real time while allowing for changes in points of view as the fluoroscope moves around the patient. Second, the catheters, guide wires, and stents are flexible devices and therefore must be modeled as deformable objects, which is not the case for rigid laparoscopic tools. To control the motion of a catheter or guide wire within the vascular network, the physician can only push, pull or twist the proximal end of the device. Since such devices are constrained inside the patient's vasculature, it is the combination of input forces and contact forces that allow them to be moved toward a target.

The main characteristics of wire-like structures or flexible objects or segmented objects that simulation models attempt to capture include geometric non-linearities, high tensile strength and low resistance to bending. However, many known flexible object simulation models are not suitable for real-time applications.

Known models for flexible objects used in the context of medical simulation include articulated body methods ("ABM"), which represent the object as a set of rigid segments connected by rotary and torsional springs (see, e.g., Dawson et al., "*Designing a Computer-Based Simulator for Interventional Cardiology Training*", Catheterization and Cardiovascular Interventions 51:522-527 (2000)). However, since these methods use explicit integration, they do not provide the necessary stiffness and speed as required by many applications. In addition, stability is affected by the length of the smallest segment.

Other known models for flexible objects use beam finite elements (see, e.g., Cotin et. al., "*New Approaches to Catheter Navigation for Interventional Radiology Simulation*", MICCAI (2005)). However, these methods exhibit problems similar to the articulated body method, due to using explicit integration and iterative solution techniques.

Further, many non-invasive procedures use multiple coaxial tools, such as a wire sliding inside a catheter. Some procedures use three or more coaxial tools. These tools not only interact with a patient's vascular system or other internal barriers, but interact with each other in their coupled state. The interaction with each other greatly complicates a simulation of multiple tools, requiring much more complex calculations.

Prior solutions for simulating coupled objects use external forces and explicit integration methods. The problem with these approaches is that either the coupling is not enforced strictly enough, resulting in noticeable interpenetrations between the objects, or the coupled system exhibits unstable behavior. Other known solutions augment a system matrix to enforce strict coupling (see Cotin et al., "*Real-Time Elastic Deformations of Soft Tissues for Surgery Simulation*", TVCG 1998 and Lindblad, "*Real-time Finite Element Based Virtual Tissue Cutting*", MMVR 2006). However, known augmented systems require computationally demanding numerical algorithms, which may prevent their application in real-time simulation applications. Another known coupling method enforces constraints during collision detection (see Baraff et al., "*Large Steps in Cloth Simulation*", SIGGRAPH 1998). However, this method is limited to handling unilateral surface contact for self-collision detection and works for a single object only.

Based on the foregoing, there is a need for an improved system and method for simulating coupled tools or other segmented objects.

SUMMARY OF THE INVENTION

One embodiment is a simulator for simulating a first object and a second object that is coupled to the first object. The simulator models the first and second objects as a plurality of segments, with each segment having a plurality of nodes connected by one or more edges. The simulator then indexes each of the nodes and couples at least one node of the first object to a node of the second object. The indexing and coupling is based on the current simulated position of the first and second objects. The simulator then generates and solves a linear system of equations $Ay=b$ from the indexing, and updates a position of each of the nodes. The simulator flow then dynamically re-indexes the nodes, and continues in a loop.

DETAILED DESCRIPTION

Figure 1:
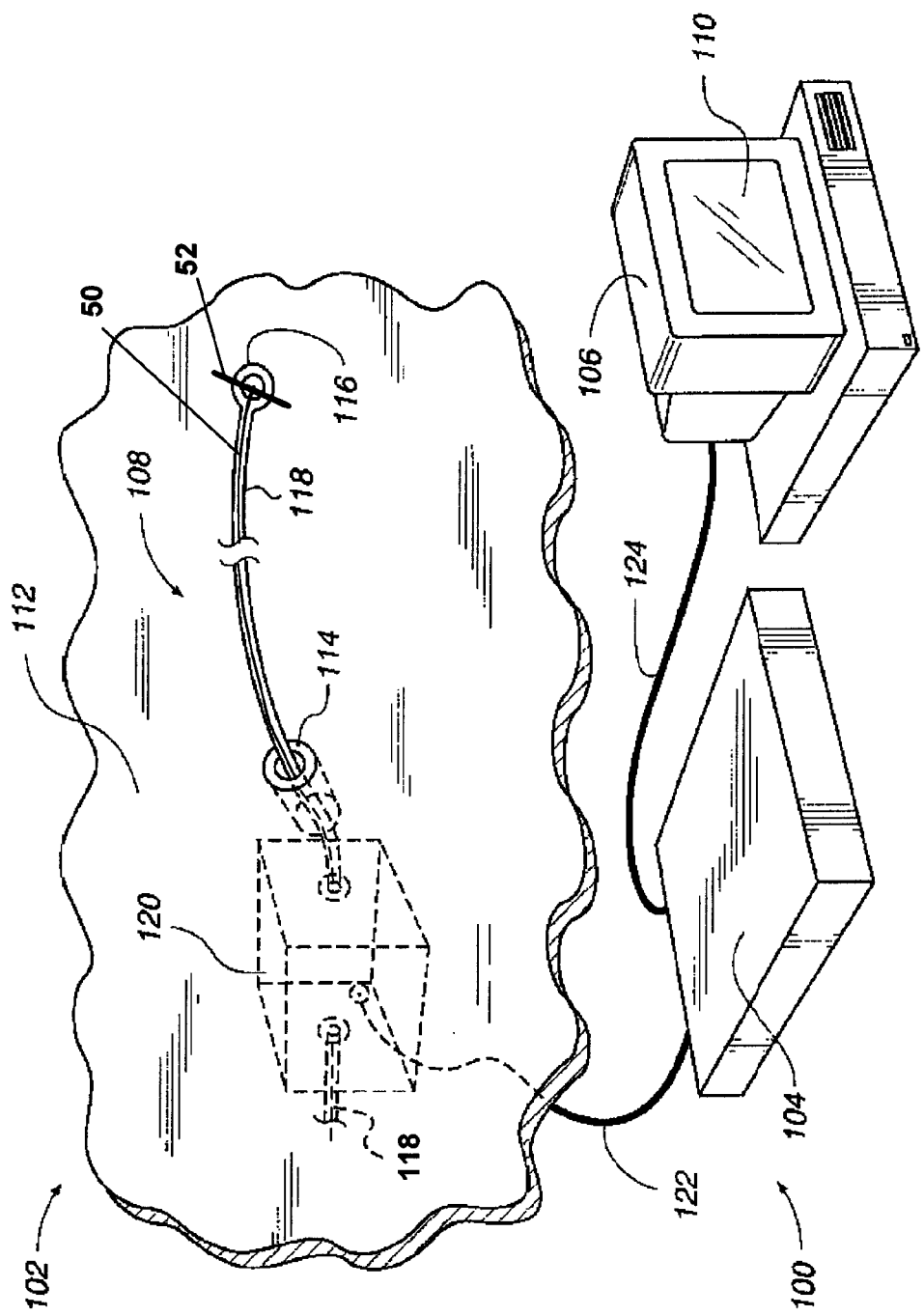
FIG. 1 is a perspective diagram of a system for simulating coupled flexible or segmented objects in accordance with one embodiment.

FIG. 1 is a perspective diagram of a system 100 for simulating coupled flexible or segmented objects in accordance with one embodiment. System 100 is used to simulate a wire sliding within a catheter during a medical procedure, but can be used to simulate any coupled segmented objects. System 100 includes a human/computer interface 102, a electronic interface 104 and a computer 106.

A catheter 108 and a wire 50 that coaxially slides within catheter 108 is manipulated by a user and virtual reality images are displayed on a monitor 110 of computer 106 in response to such manipulations. Computer 106 can be any type of general purpose or specialized computer that includes a processor and a memory for storing instructions that are executed by the processor.

In addition to catheter 108 and wire 50, a human/computer interface 102 includes a barrier 112 and a "central line" 114 through which catheter 108 and wire 50 is inserted into the "body". Barrier 112 is used to represent the portion of the skin covering the body of a patient. In one embodiment, barrier 112 is formed from a mannequin or other life-like representation of a body or body portion (e.g., the torso, arm or leg). Central line 114 is inserted into barrier 112 to provide an entry and removal point from barrier 112 for catheter 108, and to allow the manipulation of the distal portion of catheter 108 and wire 50 within the body of the patient while minimizing tissue damage. Catheter 108 and wire 50 can be any commercially available catheters and wires, although in one embodiment the end of catheter 108 is removed to prevent any potential damage to persons or property since it is not required for the medical simulation. Other tools to be simulated can be coaxial to catheter 108 or otherwise coupled to catheter 108.

Catheter 108 includes a handle or "grip" 116 and a shaft 118. Grip 116 can be any conventional device used to manipulate catheter 108, or grip 116 may comprise shaft 118 itself. Wire 50 also includes a handle 52 so that it may be manipulated independently of catheter 108. Catheter 108 and wire 50 are elongated flexible objects but may be any type of objects that can be represented by connected segments.

A haptic interface 120 receives shaft 118 and wire 50 and applies haptic feedback on shaft 118 and wire 50 that can be felt by the user and provides the user with a sensation that catheter 108 and wire 50 is entering an actual body. In one embodiment, haptic interface 120 includes one or more actuators and other devices that generate the haptic feedback. Haptic interface 120 can be any known device for generating haptic feedback on shaft 118 and wire 50, including the haptic interface disclosed in U.S. Pat. No. 5,821,920. Haptic interface 120 also determines the position of catheter 108 and wire 50 within the simulated body, including whether catheter 108 and wire 50 is being pushed, pulled or twisted by the user.

Electronic interface 104 receives position information from haptic interface 120 via cable 122, and transmits the information to computer 106 via cable 124. In response, computer 106 models the position of catheter 108 and wire 50, as disclosed in more detail below, and generates a graphical image of the simulation on monitor 110. Further, computer 106 generates the required haptic effects based on the position of catheter 108, and provides signals to haptic interface 120 to generate the haptic effects that are felt by the user.

Figure 2:
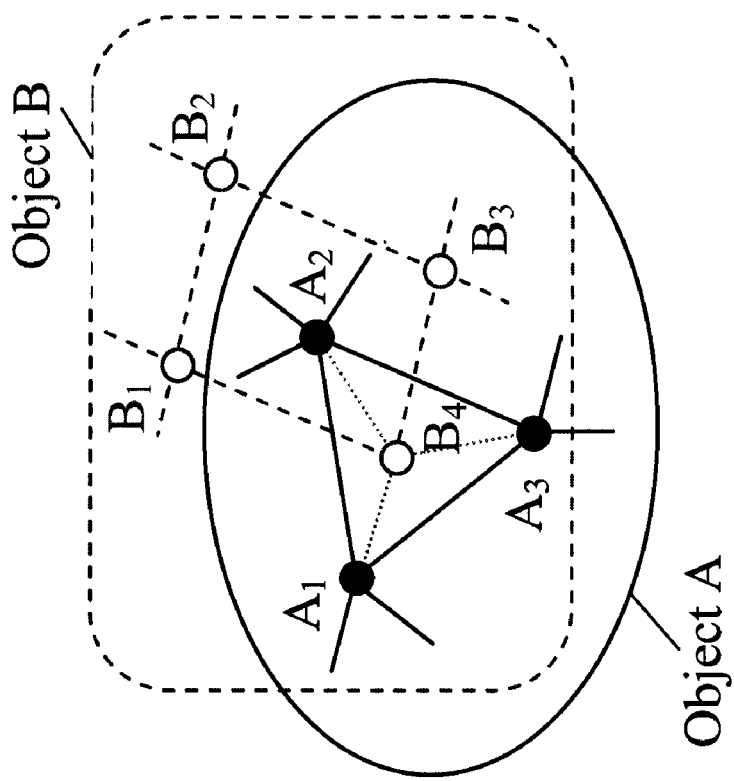
FIG. 2 illustrates two coupled objects in accordance with one embodiment.

One embodiment models each object to be simulated into a plurality of nodes, and then establishes a mathematical relationship between nodes of the objects. For example, FIG. 2 illustrates two coupled objects, object A and object B, in accordance with one embodiment. In this example, nodes $A_1$, $A_2$, and $A_3$ of object A are coupled to node $B_4$ of object B, as indicated by the lines between the nodes. The coupling can be either static or dynamic (i.e., time-varying). The nature of the coupling is such that the coupled objects cannot be substituted with a single object. The mathematical relationship of the coupling can be expressed by the following system of equations:

$$C(x) = 0$$

where x stands for the positions of the nodes in the coupled systems.

In one embodiment, the two coupled objects to be simulated are flexible objects such as the flexible objects that are modeled as disclosed in U.S. patent application Ser. No. 11/549,834, filed on Oct. 16, 2006 and entitled "Flexible Object Simulator". Each flexible object is modeled as a serial chain of connected segments that form a segmented space curve. Each segment is connected by segment nodes along the centerline or space curve of the object and surrounding nodes are placed around the segment nodes to form the segments. Each segment is then decomposed into triangular prisms by connecting the nodes with edges, and each prism is further decomposed into three tetrahedral elements to create a "mesh".

Figure 3:
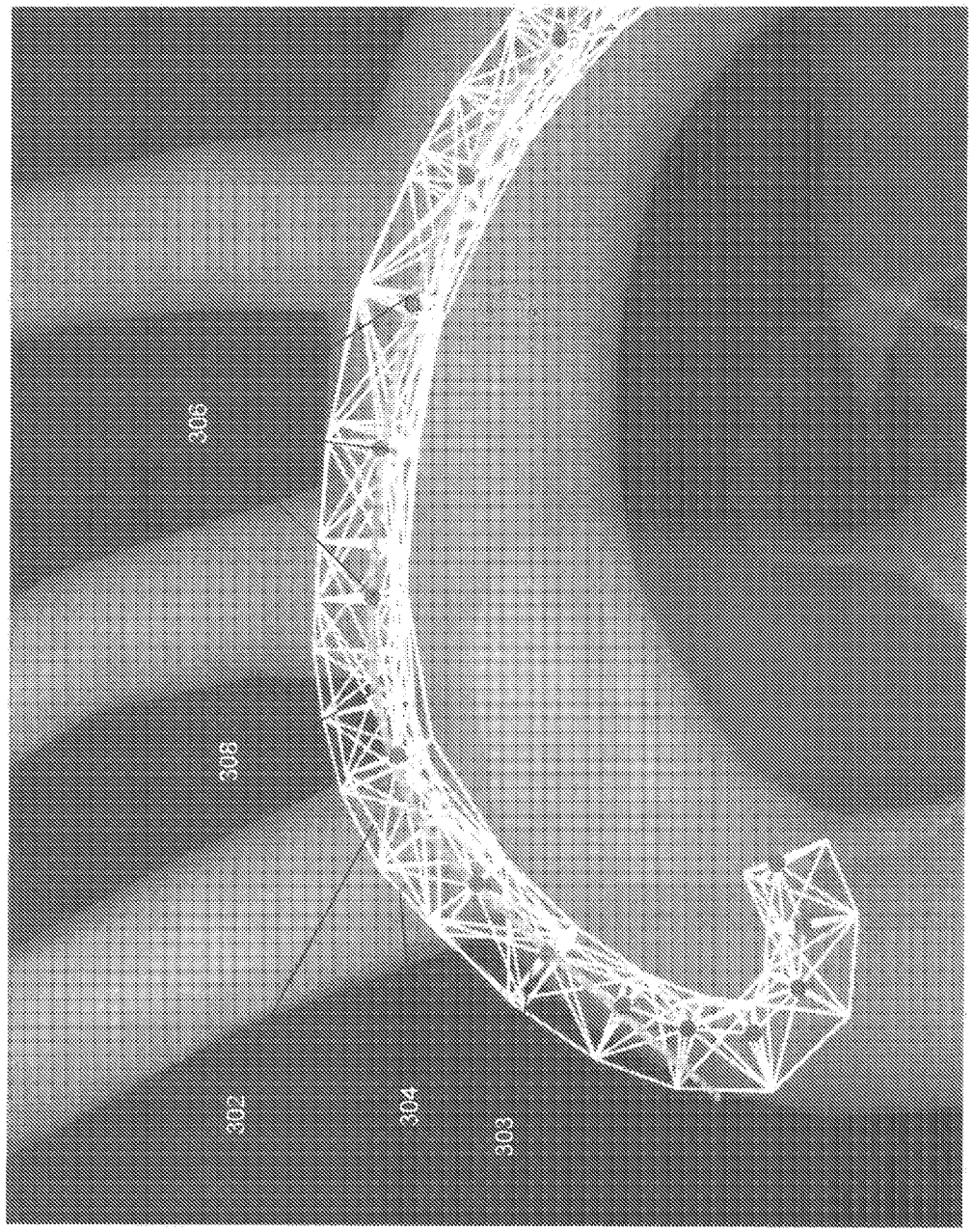
FIG. 3 illustrates two tools, an inner tool and an outer tool.

In one embodiment, each object represents a single flexible tool, such as a catheter or a guide wire in simulation system 100. FIG. 3 illustrates two tools, an inner tool 302 and an outer tool 304. Inner tool 302 has an end portion 303. To model coaxial interaction between the two systems, the centerline nodes 306 of inner tool 302 are coupled to a smooth curve 308 (e.g. a B-spline curve) which is defined by the centerline nodes of outer tool 304. The coupling allows inner tool 302 to slide along smooth curve 308 defined by outer tool 304. The inner and outer tools push and pull on each other to satisfy the coupling equation, resulting in coupled tool-tool interaction.

The coupling for a single node of inner tool 302 is expressed by the following equation:

$$C = x_i - p$$

where $x_i$ is a centerline node of inner tool 302 and p is a point on B-spline curve 308 evaluated at parametric coordinate value u, which is determined by the relative insertion of the two tools, as disclosed below. Since B-spline curve 308 has limited support, only a small number of outer tool nodes in the vicinity of the curve point p are included in the equation. For a degree 3 B-spline curve, p is written as:

$$p = b_0 x_a + b_1 x_b + b_2 x_c + b_3 x_d$$

The terms $b_0 \ldots b_3$ are the B-spline basis functions evaluated at u, and $x_a \ldots x_d$ are the position of the outer tool nodes that belong to the basis functions. The outer tool nodes act as the control points for the B-spline curve.

In general, the coupling parameters determine which nodes of the objects interact with each other (i.e., which nodes participate in the coupling equations). The nodes that are included in the equations $C(x) = 0$ are relevant to dynamic node indexing, disclosed below.

The parametric coordinate value u used for the B-spline curve evaluation for the coaxial coupling of the inner and outer tools of FIG. 3 can be found from the relative insertion of the two tools. The algorithm marches along the outer tool B-spline curve by increasing the parametric coordinate value u, until the length of the B-spline curve segment between the starting point p(0) and the current point p(u) is equal to the sum of the insertion value for the inner tool relative to the outer tool and the length along the inner tool centerline curve between the inner tool first centerline node and inner tool centerline node $x_i$.

Figure 4:
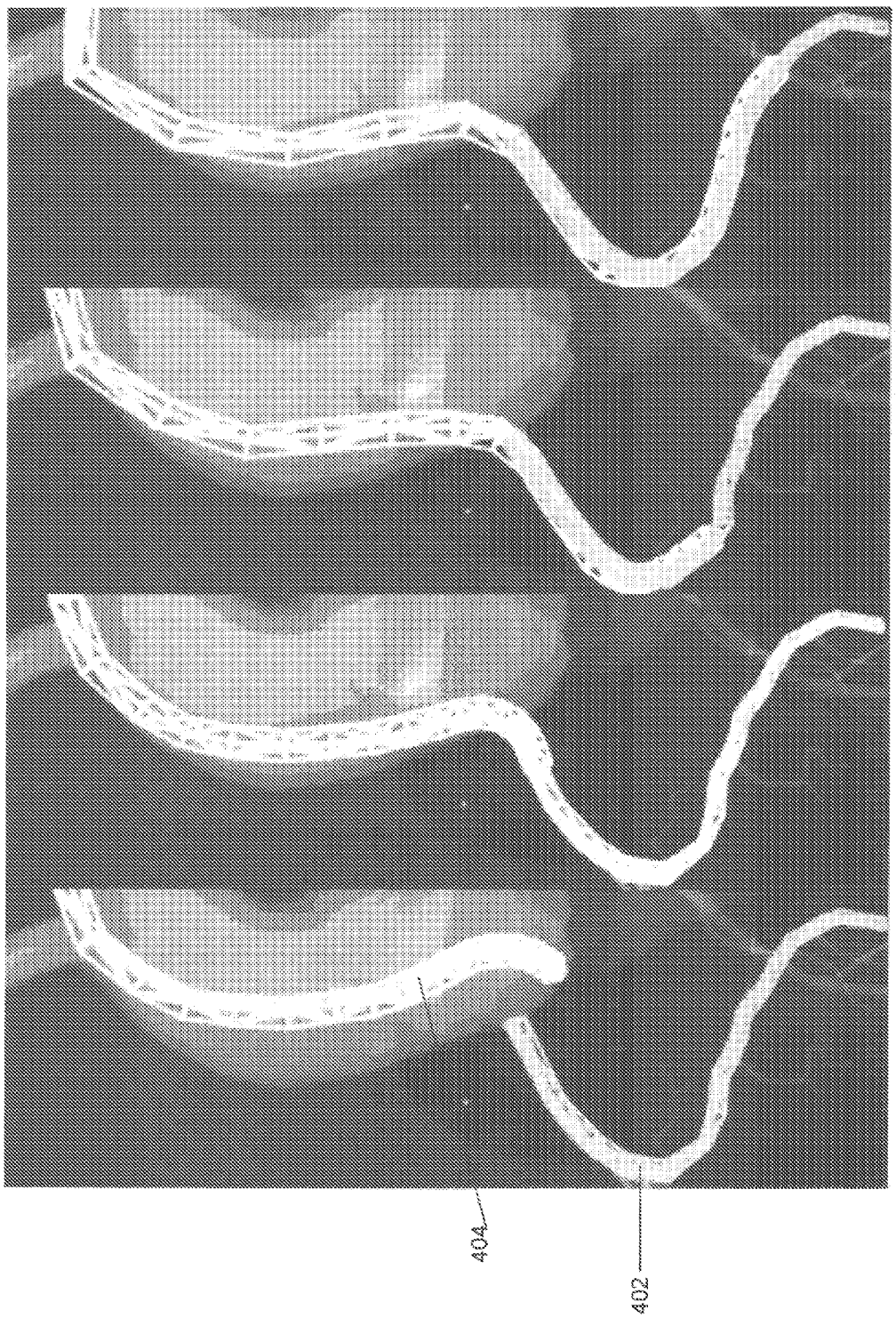
FIG. 4 illustrates, from left to right, the progression of a simulation of a tool being coaxially inserted into a vein or other simulated object and shows substantial deformation of both the inner and outer meshes.

FIG. 4 illustrates, from left to right, the progression of a simulation of a tool 402 being coaxially inserted into a vein 404 or other simulated object and shows substantial deformation of both the inner and outer meshes. In the embodiment of FIG. 4, buckling of inner tool 402 inside the vein 404 is the desired behavior, and the coupling parameter u can be found from iteratively searching for the closest point on the curve to the inner tool centerline node $x_i$. The search procedure uses the derivative of u with respect to position x, which can be written as:

$$\frac{du}{dx} = \frac{1}{c_u \cdot c_u + (c-x) \cdot c_{uu}} c_u$$

In one embodiment, the nodes of the coupled objects are dynamically indexed. In general, the dynamic node indexing considers the connectivity of the individual models along with the connectivity of the coupling to derive an efficient indexing scheme for the coupled system. The goal of one embodiment is to minimize the number of off-diagonal blocks in the system matrix A. Thus, the method results in more efficient and faster simulation of the coupled systems In contrast, the static node indexing method disclosed in U.S. application Ser. No. 11,549,834 results in an optimal linear time O(n) solution algorithm for a single object. For coupled objects, such as coaxial nested tools, the static node indexing method results in a large number of off-diagonal terms in the system matrix. The off-diagonal terms increase the bandwidth of the matrix and result in suboptimal performance of the solver. When the coupling is time-varying or dynamic (i.e., when the coupling parameters change frequently), a static indexing method is not sufficient and a dynamic algorithm is needed. The dynamic indexing algorithm maintains a mapping between the node indexes used by the simulator and the node indexes used by the numerical solver. In every simulation loop, the mapping is updated based on the coupling parameters and the current state of the simulator.

In one embodiment that simulates nested coaxial tools, two indexes are used to identify a node: one for the tool axis and another for the node index within the tool. The two indexes are mapped to a single index for the solver. The mapping consists of tables that map from the tool node index to the solver node index, and a table for the solver that maps a solver node index to a tool axis index and tool node index pair. The mapping is updated based on the type of coupling between the tools as well as the relative insertion between the tools.

Figure 5:
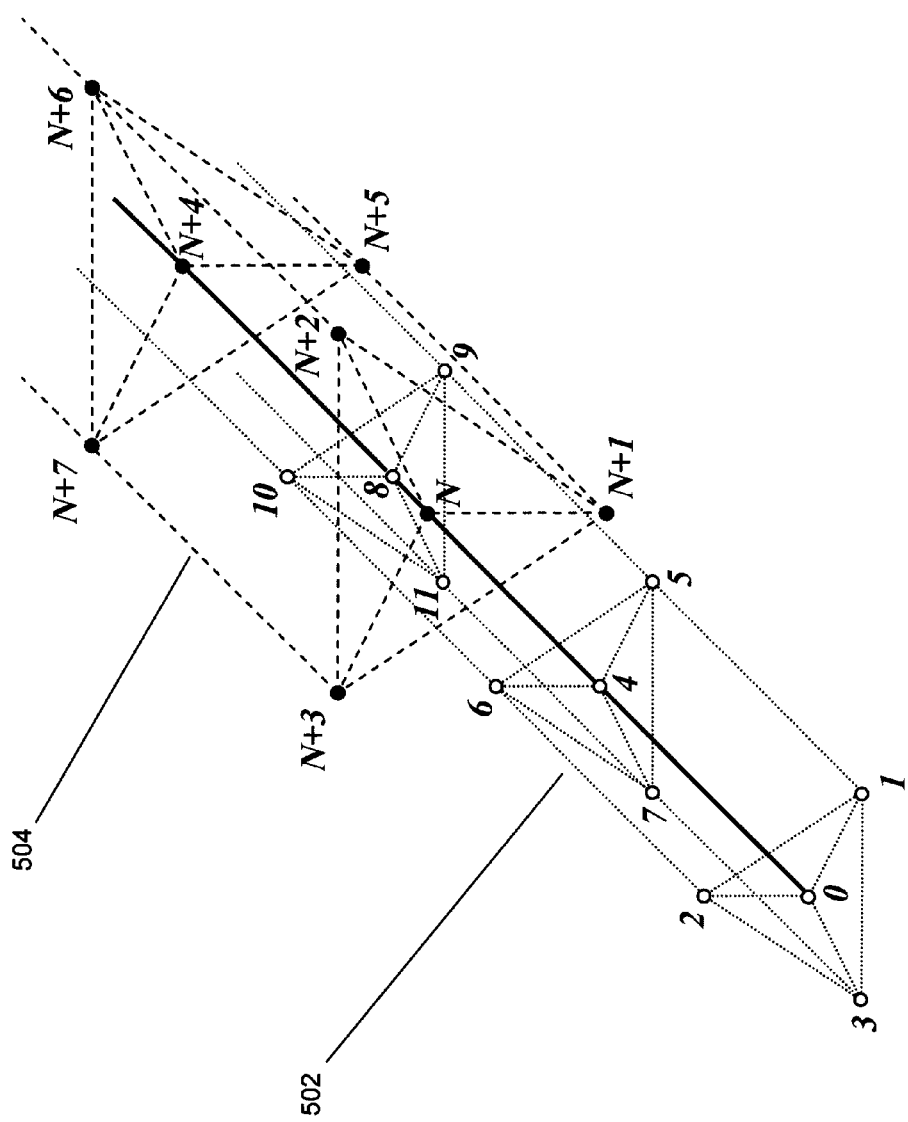
FIGS. 5 and 6 illustrate for comparison purposes the solver indexes obtained from static indexing and dynamic indexing for two coupled tools.
Figure 6:
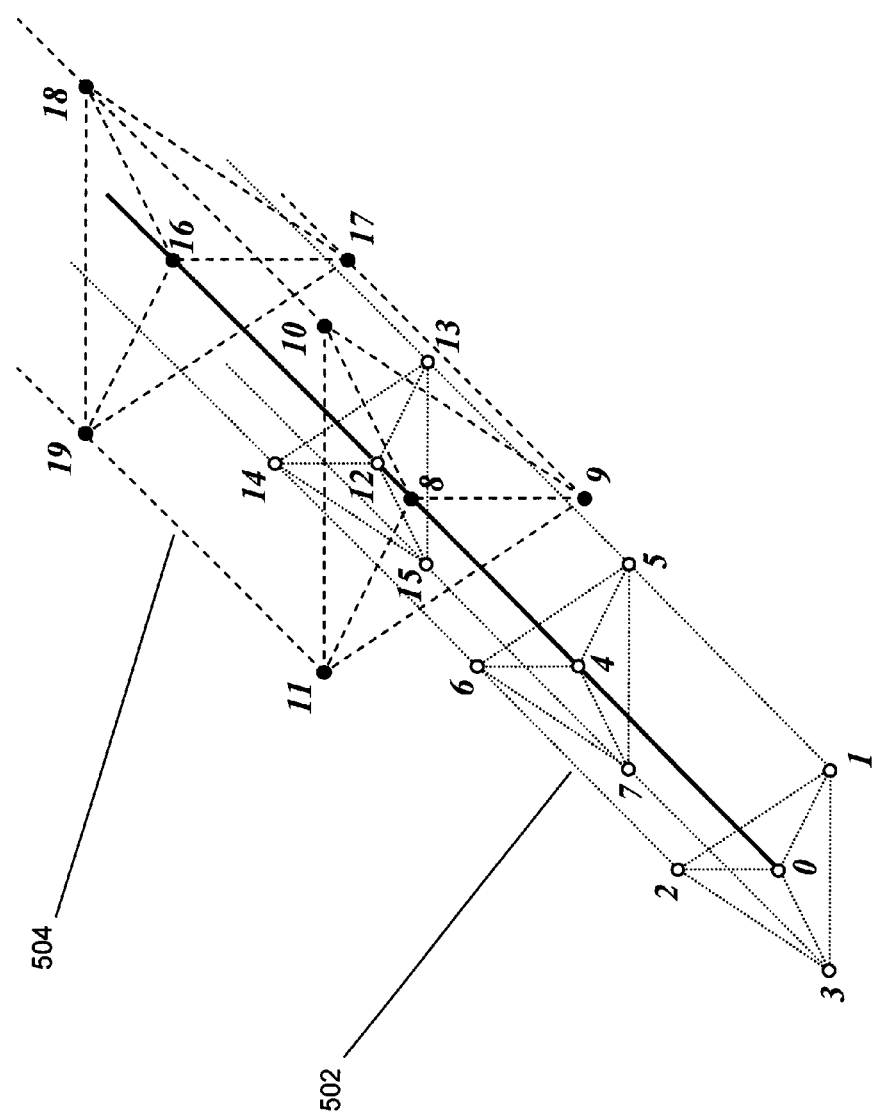

FIGS. 5 and 6 illustrate for comparison purposes the solver indexes obtained from static indexing (FIG. 5) and dynamic indexing (FIG. 6) for two coupled tools, inner tool 502 and outer tool 504. To illustrate the indexing methods, it is assumed that inner tool 502 has N nodes. During static indexing, the nodes of inner tool 502 are assigned first, and then the nodes of outer tool 504 are set. The problem with the static indexing method of FIG. 5 is that nodes 4, 8 of the inner tool and node N of the outer tool are included in the same coupling equation, leading to distant off-diagonal terms in the system matrix, described below. The problem extends to all coupled centerline nodes of the inner and outer tools.

In contrast, in FIG. 6 node reordering is dynamically performed based on the relative locations of the two tools. The result of the dynamic indexing method of FIG. 6 is that nodes 4, 12 of the inner tool and node 8 of the outer tool are included in the same coupling equation. No distant off-diagonal terms are created in the system matrix, because the maximum difference between the indexes of the nodes that are included in the coupling equations is independent of the number of nodes N of the inner tool.

Figure 7:
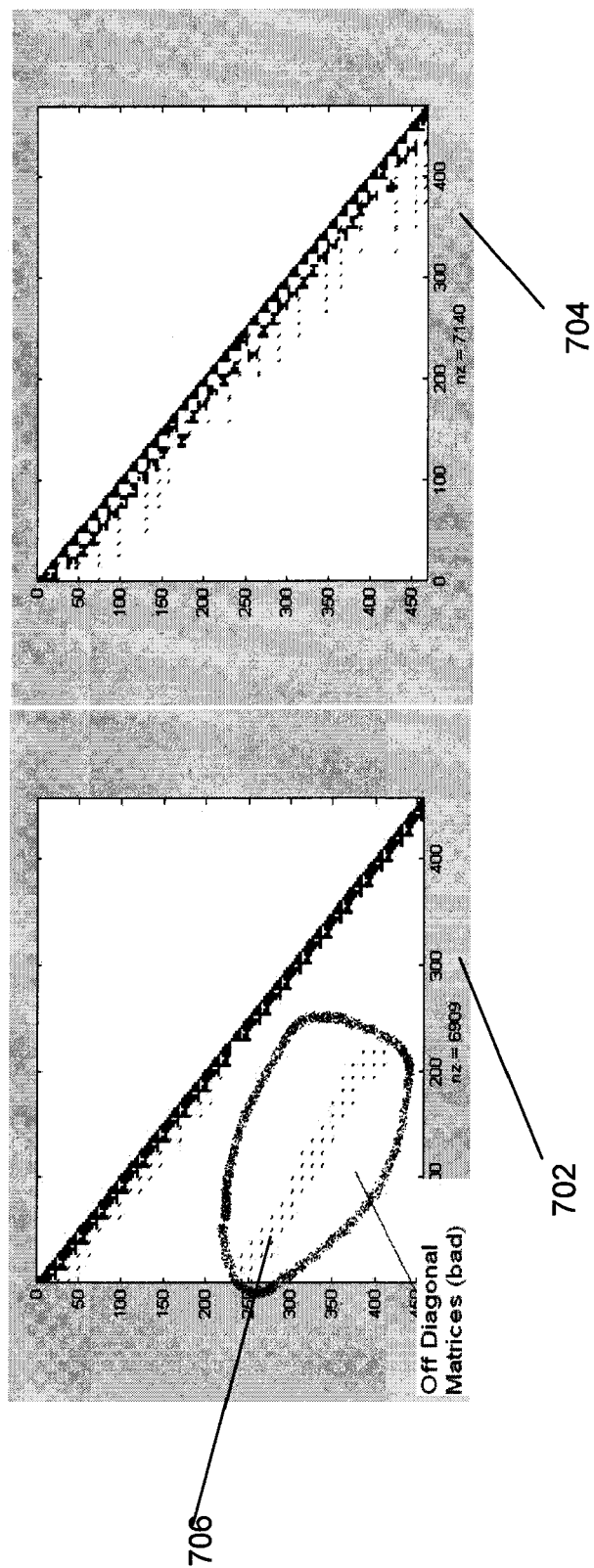
FIG. 7 illustrates two graphs which illustrate the system matrix with static indexing of coupled objects and the system matrix with dynamic indexing of coupled objects in accordance with one embodiment.

FIG. 7 illustrates two graphs of which graph 702 illustrates the system matrix with static indexing of coupled objects and graph 704 illustrates the system matrix with dynamic indexing of coupled objects in accordance with one embodiment. As shown, the static indexing method of graph 702 results in off diagonal terms 706 which greatly increases the necessary computations for the numerical solver. In contrast, the dynamic indexing method of graph 704 reduces the bandwidth of the matrix, which improves the performance of the solver. In practice, the performance gain can be significant, because the complexity of the solution procedure is reduced from $O(n^3)$ to $O(n)$.

The dynamic node indexing methods of one embodiment facilitate the development of efficient solution algorithms for a class of applications. In general, the applications require the solution of a linear system of equations, written in the form:

$$Ay=b$$

Two examples of these applications include the simulation of flexible objects dynamics using a semi-implicit time-stepping method and constrained optimization for simulation and computer aided design applications.

For simulation of coupled flexible objects, the motion of the objects is governed by Newton's second law:

$$Ma=f(x,v)$$

where x, v, and a are vectors containing the positions, velocities and accelerations of the nodes, M is a matrix representing the mass distribution in the objects, and f includes the internal and external forces acting at the nodes. The goal of the simulation is to update the positions of the nodes based on the forces acting on the object at highly interactive rates (e.g., >30 Hz). The equations of motion are integrated numerically in one embodiment using a semi-implicit time-stepping method such as disclosed in Baraff and Witkin, "*Large Steps in Cloth Simulation*", SIGGRAPH (1998) ("Baraff").

An important step of the algorithm is the solution of the following linear system:

$$Ay=b$$

which is obtained for a given time step h as:

$$A = \left[ M - h\frac{\partial f}{\partial v} - h^2 \frac{\partial f}{\partial x} \right]$$

$$b = h\left( f + h\frac{\partial f}{\partial x} v \right)$$

The result of the solution step, y, is used to update the node positions and velocities in the simulation loop.

The coupling equations result in external forces on the objects. The force acting on node i due to the coupling is written as:

$$f_i = -k_x \frac{\partial C}{\partial x_i} C - k_v \frac{\partial C}{\partial x_i} \dot{C}$$

where $k_x$ and $k_v$ determine the coupling stiffness and damping, respectively. The force derivatives used by the semi-implicit integration technique are disclosed in, for example, Baraff.

For constrained optimization applications the objectives projection method for a system of constraints C and objectives f is:

$$P = I - J^T(JJ^T)^{-1}J.$$

$$\Delta q = P \nabla f$$

This corresponds to solving Ay=b when first solving $JJ^T x = J\nabla f$ to evaluate the vector $(JJ^T)^{-1} J \nabla f$, followed by $\Delta q = (I - J^T x)\nabla f$.

The non-zero entries (i.e., connectivity), of the implicit update matrix and that of $JJ^T$ for optimization are the same. Similarly, Newton iteration to minimize the augmented Lagrange equations for a system of equations C with objectives f benefit from an optimal node indexing of the system matrix. This system can be solved through a quadratic approximation of the Taylor series for the Lagrangian, L, $$L = f + \lambda C.$$

For optimization applications, the outer product of the constraint gradients $$\frac{\partial C}{\partial x_i}$$

define the system matrix, along with objectives, $f_i$, rather than forces.

Figure 8:
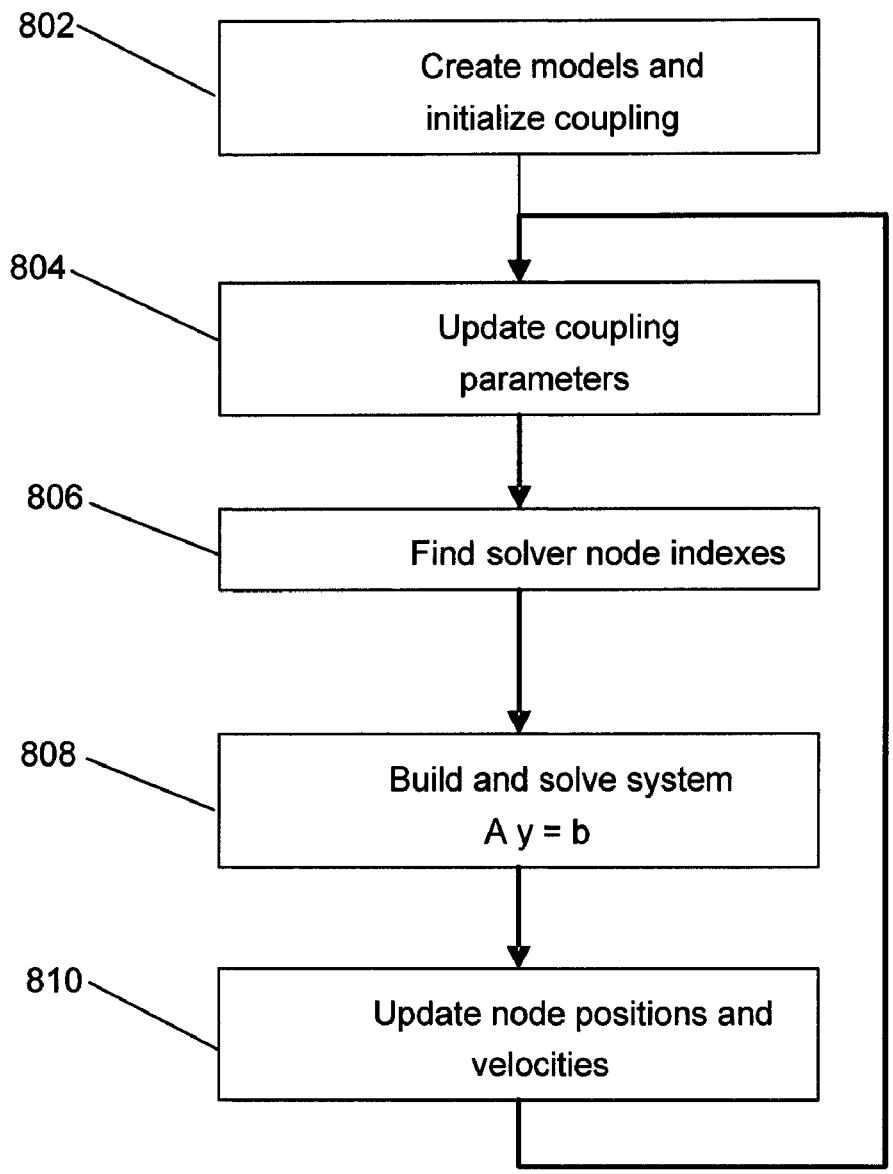
FIG. 8 is a flow diagram of the functionality performed by the computer to simulate coupled objects in accordance with one embodiment.

FIG. 8 is a flow diagram of the functionality performed by computer 106 of FIG. 1 to simulate coupled objects such as catheter 108 and wire 50 in accordance with one embodiment of the present invention. In one embodiment, the functionality of FIG. 8 is implemented by software stored in memory and executed by a processor. In other embodiments, the functionality can be performed by hardware, or any combination of hardware and software.

At 802, each of the objects to be simulated is modeled as a serial chain of connected segments that form a segmented space curve. Each segment is connected by segment nodes along the centerline or space curve of the object and surrounding nodes are placed around the segment nodes to form the segments. Each node is connected by one or more edges. Each segment is then decomposed into triangular prisms by connecting the nodes with edges, and each prism is further decomposed into three tetrahedral elements to create a "mesh". In other embodiment, the mesh may be formed of triangular elements or other shaped elements. The indexing and coupling parameters among nodes of each object is initialized. In one embodiment, the inner tool centerline nodes are coupled to a smooth curve defined by the outer tool centerline nodes.

At 804, the coupling parameters are updated based on the state of the simulation and input from the user.

At 806, the dynamic node indexing method disclosed above is implemented. The node indexes for the solver are found based on the coupling parameters from 804.

At 808, once the mapping between the simulation and solver node indexes are known, the global linear system matrix A is assembled and the system Ay=b is solved. The dynamic node indexing method reduces the bandwidth of the system matrix A.

At 810, after the solution to the linear system Ay=b is obtained, the node positions and/or velocities are updated. Flow then returns to 804 where the simulation loop is continuously executed.

As disclosed, embodiments simulate coupled objects by dynamically indexing the coupled nodes of each object and then using implicit integration methods. The result is high coupling coefficients, resulting in tight coupling between the objects, which is not possible to achieve with external forces and explicit integration methods.

Several embodiments are specifically illustrated and/or described herein. However, it will be appreciated that modifications and variations of the present invention are covered by the above teachings and within the purview of the appended claims without departing from the spirit and intended scope of the invention.

Figure 9:
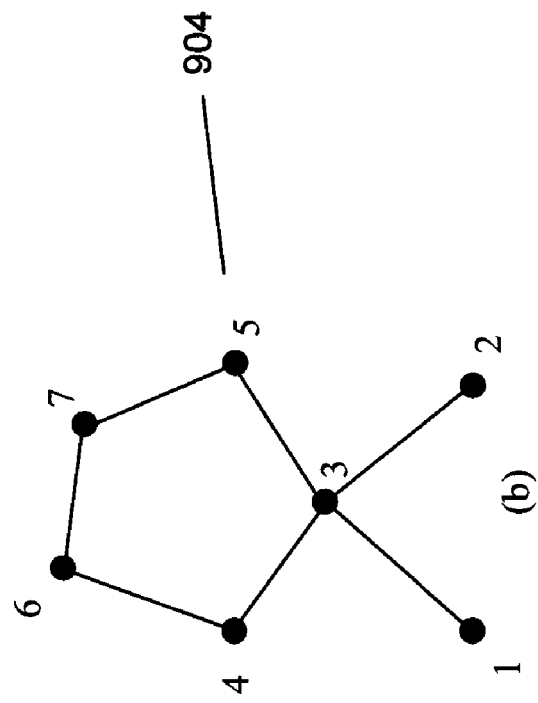
FIG. 9 illustrates an example node indexing embodiment in which one suture uses static node indexing another suture 904 uses dynamic node indexing.
Figure 9:
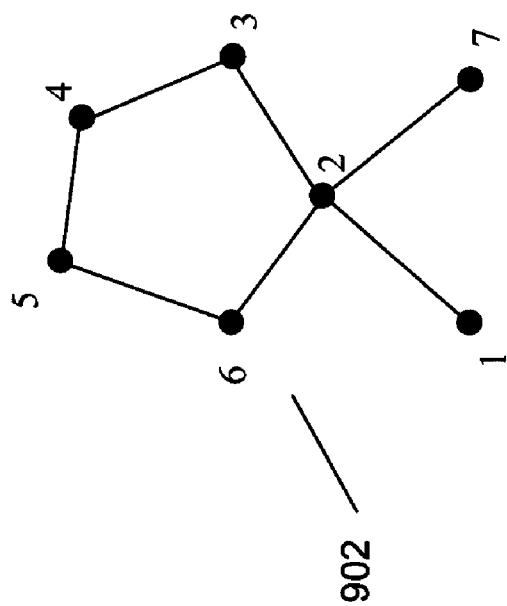

For example, the dynamic node indexing disclosed above in connection with two coupled flexible objects can also apply to the simulation of other shaped objects, and the simulation of more than two coupled objects. Suturing and knot-tying simulation is one example that can significantly benefit from the disclosed dynamic node indexing method. FIG. 9 illustrates an example node indexing embodiment in which suture 902 uses static node indexing, and suture 904 dynamic node indexing. In suture 904, node 3 represents a tight knot, and nodes 4-7 represent nodes in the thread that form a loop. The specific node indexing shown in 904 reduces the bandwidth of the system matrix, because the difference between the indexes of two neighboring nodes is reduced from a maximum of 5 to a maximum of 2.

Figure 10:
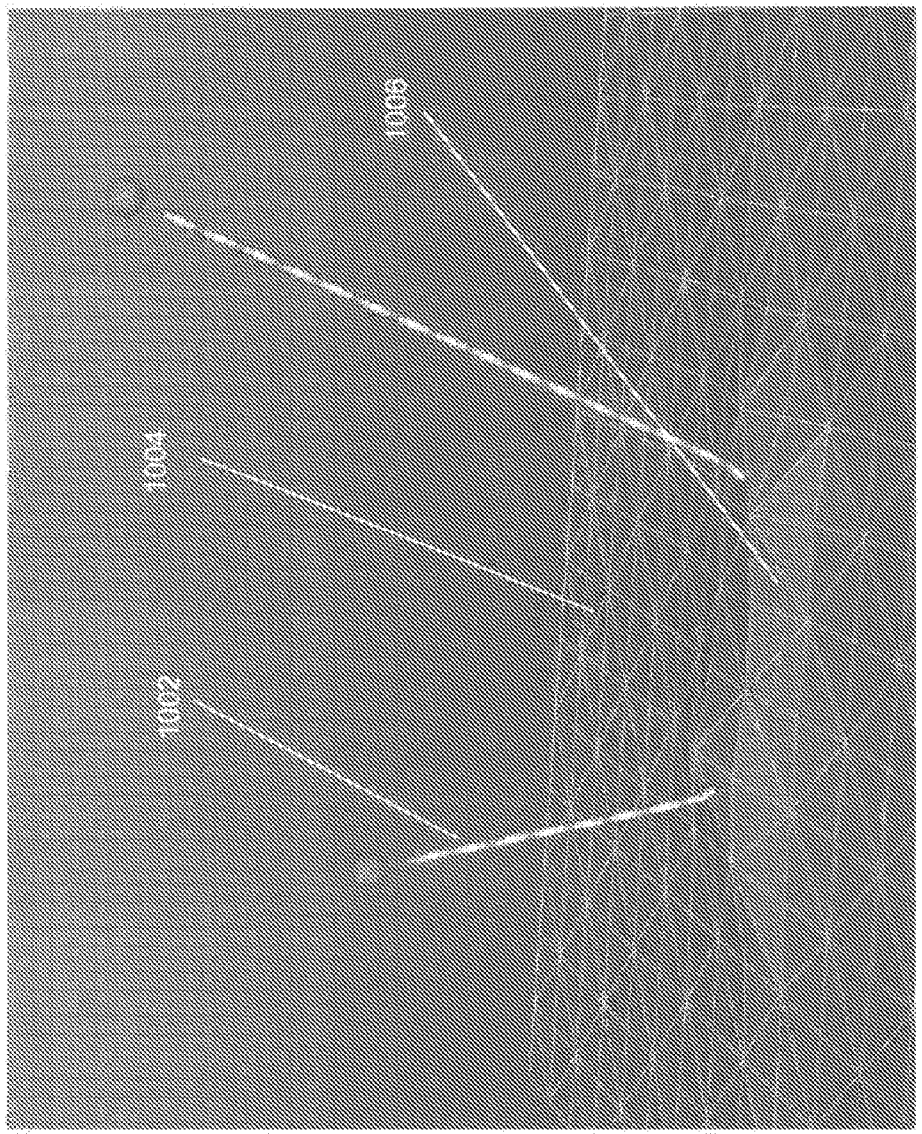
FIG. 10 illustrates a coupling between a thread and a tissue along a curve inside the tissue in accordance with one embodiment.

Another example of the dynamic coupling between two flexible objects disclosed above is simulation of a suture thread embedded in soft tissue. FIG. 10 illustrates the coupling between thread 1002 and tissue 1004 along curve 1006 inside the tissue. Thread 1002 can move along curve 1006, such that any motion perpendicular to curve 1006 causes tissue 1004 to deform. Similarly, deformation of the tissue 1004 causes thread 1002 to react and follow curve 1006 accordingly. The coupling for a single node of thread 1002 is expressed by the following equation:

$$C = \left(I - \frac{c_u c_u^T}{|c_u|^2}\right)(x_i - p)$$

where $x_i$ is a node of thread 1002, p is a point on curve 1006 evaluated at parametric coordinate value u, and $c_u$ is the derivative of the curve evaluated at u. The parameter u is found by searching for the point on the curve closest to $x_i$.

What is claimed is:

1. A computer-implemented method for simulating a first object, a second object, and a coupling between the first object and the second object, said method comprising:
   (a) modeling, by a computer, each of the first and second objects as a plurality of segments, each segment having a plurality of nodes connected by one or more edges, wherein the plurality of nodes includes a first node of the first object and a second node of the second object;

(b) dynamically assigning, by the computer, a first index to the first node of the first object and a second index to the second node of the second object, wherein the first and second indexes are based on a relative position of the first and second objects, wherein the first and second indexes are based on the coupling between the first object and the second object, and wherein dynamically assigning the first and second indexes is adapted to reduce a bandwidth of a linear system matrix in comparison to a prior indexing;

(c) generating, by the computer, a linear system of equations based on the first and second indexes;

(d) solving, by the computer, the linear system of equations:

(e) updating, by the computer, a position of each of the plurality of nodes based on the solved linear system of equations, wherein the position of each of the plurality of nodes is used to simulate the first object and the second object; and (f) returning to (b) at least once.

2. The method of claim 1, wherein at least a portion of the linear system of equations is computed using a semi-implicit time-stepping method.

3. The method of claim 1, wherein the first and second objects are elongated flexible objects.

4. The method of claim 3, wherein the first object is a catheter and the second object is a wire coaxially inserted in the first object.

5. The method of claim 1, wherein the coupling is substantially equal to $x_i-p$.

6. The method of claim 1, wherein the first object comprises first centerline nodes and the second object comprises second centerline nodes and the coupling comprises coupling the first centerline nodes to a curve formed by the second centerline nodes.

7. The method of claim 1, further comprising updating a velocity of each of the nodes.

8. The method of claim 1, wherein the first and second objects are segmented flexible objects.

9. A non-transitory computer readable medium having instructions for simulating a first object, a second object, and a coupling between the first object and the second object, the instructions, when executed by a processor, causes the processor to:

(a) model the first and second objects as a plurality of segments, each segment having a plurality of nodes connected by one or more edges. Wherein the plurality of nodes includes a first node of the first object and a second node of the second object;

(b) dynamically assign a first index to the first node of the first object and a second index to the second node of the second object, wherein the first and second indexes are based on a relative position of the first and second objects, wherein the first and second indexes are based on the coupling between the first object and the second object, and wherein dynamically assigning the first and second indexes is adapted to reduce a bandwidth of a linear system matrix in comparison to a prior indexing;

(c) generate a linear system of equations from the indexing;

(d) solve the linear system of equations;

(e) update a position of each of the plurality of nodes based on the solved linear system of equations, wherein the position of each of the plurality of nodes is used to simulate the first object and the second object; and (f) return to (b) at least once.

10. The non-transitory computer readable medium of claim 9, wherein at least a portion of the linear system of equations is computed using a semi-implicit time-stepping method.

11. The non-transitory computer readable medium of claim 9, wherein the first and second objects are elongated flexible objects.

12. The non-transitory computer readable medium of claim 11, wherein the first object is a catheter and the second object is a wire coaxially inserted in the first object.

13. The non-transitory computer readable medium of claim 9, wherein the coupling is substantially equal to $x_i-p$.

14. The non-transitory computer readable medium of claim 9, wherein the first object comprises first centerline nodes and the second object comprises second centerline nodes and the coupling comprises coupling the first centerline nodes to a curve formed by the second centerline nodes.

15. The non-transitory computer readable medium of claim 9, the instructions when executed further causes the processor to update comprising updating a velocity of each of the nodes.

16. An apparatus for simulating a first object, a second object, and a coupling between the first object and the second object, said apparatus comprising:
one or more processors configured to:
(a) model each of the first and second objects as a plurality of segments, each segment having a plurality of nodes connected by one or more edges, wherein the plurality of nodes includes a first node of the first object and a second node of the second object;
(b) dynamically assign a first index to the first node of the first object and a second index to the second node of the second object, wherein the first and second indexes are based on a relative position of the first and second objects, wherein the first and second indexes are based on the coupling between the first object and the second object, and wherein dynamically assigning the first and second indexes is adapted to reduce a bandwidth of a linear system matrix in comparison to a prior indexing;
(c) generate a linear system of equations from the index;
(d) solve the linear system of equations;
(e) update a position of each of the plurality of nodes based on the solved linear system of equations, wherein the position of each of the plurality of nodes is used to simulate the first object and the second object; and
(f) return to (b) at least once.

17. The apparatus of claim 16, wherein at least a portion of the linear system of equations is computed using a semi-implicit time-stepping method.

18. The apparatus of claim 16, wherein the first and second objects are elongated flexible objects.

19. The apparatus of claim 18, wherein the first object is a catheter and the second object is a wire coaxially inserted in the first object.

20. The apparatus of claim 16, wherein the coupling is substantially equal to $x_i-p$.

21. A computer-implemented method for simulating movement of a first object relative to a second object during a simulation, wherein the first and second objects are simulated with a plurality of nodes that include a first node from the first object and a second node from the second object, the method comprising:
dynamically assigning, by a computer at a first time during the simulation, a first index for the first node and a second index for the second node according to a first position of the first object relative to the second object, wherein dynamically assigning the first and second indexes is adapted to reduce a bandwidth of a linear system matrix in comparison to a prior indexing;

determining, by the computer during the first time, a position of each of the plurality of nodes using the first index and the second index to simulate the first position of the first object relative to the second object;

dynamically assigning, by the computer at a second time during the simulation different from the first time, a third index for the first node and a fourth index for the second node according to a second position of the first object relative to the second object, wherein the third index and the fourth index are ordered differently from the first index and the second index based on a difference between the first position and the second position, wherein dynamically assigning the third and fourth indexes is adapted to reduce a bandwidth of a linear system matrix in comparison to a prior indexing; and updating, by the computer during the second time, the position of each of the plurality of nodes using the third index and the fourth index to simulate the second position of the first object relative the second object.

* * * * *